(12) United States Patent
Sawada

(10) Patent No.: US 6,385,433 B1
(45) Date of Patent: May 7, 2002

(54) SHEET STACKING DEVICE HAVING A PLURALITY OF TRAYS WITH SHIFTED END PARTS AND AN IMAGE FORMING APPARATUS USING THE SHEET STACKING DEVICE

(75) Inventor: Hirohisa Sawada, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/639,890

(22) Filed: Aug. 15, 2000

(30) Foreign Application Priority Data

Aug. 31, 1999 (JP) .......................... 11-246504
Jul. 28, 2000 (JP) ....................... 2000-228867

(51) Int. Cl.$^7$ ............................................ G03G 15/00
(52) U.S. Cl. ................................................... 399/405
(58) Field of Search ................................ 399/404, 405, 399/403; 271/279

(56) References Cited

U.S. PATENT DOCUMENTS 5,430,468 A 7/1995 Sasai et al. ................. 346/139

5,563,696 A 10/1996 Futagawa et al. ........... 355/285

FOREIGN PATENT DOCUMENTS

| JP | 358036840 A | * | 3/1983 |
| JP | 361287656 A | * | 12/1986 |
| JP | 2000238952 A | * | 9/2000 |

* cited by examiner

Primary Examiner—Quana M. Grainger
(74) Attorney, Agent, or Firm—Fitzpatrick, Cella, Harper & Scinto

(57) ABSTRACT

A sheet stacking device, or an image forming apparatus having the sheet stacking device, includes a plurality of sheet trays for stacking sheets thereon. The plurality of sheet trays are disposed to be piled substantially in a vertical direction. An end part in a width direction of at least one sheet tray of the plurality of sheet trays is shifted, in the width direction of the at least one sheet tray, from an end part in a width direction of another sheet tray of the plurality of sheet trays. Accordingly, the observability of the sheets stacked on the plurality of sheet trays is enhanced by such an arrangement.

25 Claims, 5 Drawing Sheets

SHEET STACKING DEVICE HAVING A PLURALITY OF TRAYS WITH SHIFTED END PARTS AND AN IMAGE FORMING APPARATUS USING THE SHEET STACKING DEVICE

BACKGROUND OF THE INVENTION

1. Field of the Invention

The present invention relates to a sheet stacking device for stacking sheets, an image forming apparatus, such as a copying machine, a printer or a facsimile, and an image forming apparatus having a plurality of functions of the functions of the copying machine, the printer and the facsimile.

2. Description of Related Art

In conventional image forming apparatuses, such as a copying machine, a printer, a facsimile, etc., it is general that a sheet discharge tray onto which a sheet having an image formed thereon is discharged, an original stacking tray and original discharge tray for an original, etc., are disposed on the side portion or portions of a frame body of the image forming apparatus. However, in recednt years, for the purpose of reducing a space required for installation of the image forming apparatus, it has been proposed that the sheet discharge tray, the original stacking tray and the original discharge tray are disposed on the upper portion of the image forming apparatus.

Further, in recent years, in image forming apparatuses of the kind having both an image forming part for forming an image on a sheet and an original reading part for reading image information from an original, there is widespread a composite apparatus, called MFP (Multi-Function Peripheral), having a plurality of functions including the functions of a copying machine, a facsimile, a printer, etc.

Such an MFP is required to be provided with a plurality of sheet discharge ports and a plurality of sheet stacking trays and to have a selective stacking (sorting) function of selectively stacking sheets on the applicable trays by switching the use of the sheet discharge port from one port over to another according to the purpose of the copying machine, the facsimile or the printer, and is required, from the viewpoint of an improvement in operability, to enable all the basic operations to be performed from the front side of the MFP.

An example of an image forming apparatus arranged as such an MFP is described with reference to FIG. 5.

FIG. 5 is a schematic sectional view showing a facsimile apparatus arranged as an MFP. Referring to FIG. 5, the facsimile apparatus has a frame body part 1, an original reading part 2 for reading image information from an original D, an image forming part 3 composed of a laser beam printer of an electrophotographic system, an original loading tray 4 arranged to allow a plurality of sheets of original D to be loaded thereon, a slider 18 arranged to be movable in the direction of width of the original D for regulating the width of the original D loaded on the original loading tray 4, and an original discharge tray 5 arranged to allow the original D to be stacked thereon when the original D is discharged after the image information of the original D is read by the original reading part 2.

In the facsimile apparatus, an arrow A indicates the direction of the front side of the frame body part 1, i.e., a frontward direction of the apparatus. The user of the apparatus sets, from the frontward direction of the apparatus, the original D on the original loading tray 4 in the direction of an arrow B, and then operates an operation part composed of operation buttons, etc., (not shown). When the original D is discharged from the original reading part 2 onto the original discharge tray 5, the user takes out the original D in the direction of an arrow C.

Further, the facsimile apparatus is further provided with a sheet discharge tray 6 onto which a sheet having an image formed thereon by the image forming part 3 is discharged and stacked. The sheet having an image formed thereon passes through a sheet discharge route R1 to be discharged onto the sheet discharge tray 6. The sheet as discharged is taken out in the direction of an arrow E by the user, as in the case of the original D, stretching his or her hand from the frontward direction of the apparatus. The conventional facsimile apparatus of this kind is thus arranged to allow the user to perform all the basic operations from the front side of the frame body part 1, i.e., from the frontward direction of the apparatus.

However, in such a conventional image forming apparatus, in inserting the original D, in taking out the original D and in taking out the sheet, the user must perform an operation while standing on the front side of the apparatus in the frontward direction of the apparatus, and look at the individual trays and the sheet of the original or the image-formed sheet on the respective trays from the direction of an arrow J (called a visual line J) as shown in FIG. 5.

However, the original loading tray, the original discharge tray and the sheet discharge tray, which are trays having respective different functions, are located close to each other. In addition, the user must perform an operation in a posture of looking downward at forefront portions of the respective trays, as indicated by an arrow H in FIG. 5. Therefore, the following problem arises.

To carry out the above-stated function of sorting a sheet for one purpose from a sheet for another purpose, it is necessary to provide an additional sheet discharge tray (hereinafter referred to as an upper sheet discharge tray) between the sheet discharge tray 6 and the original discharge tray 5. With the upper sheet discharge tray thus provided, the total height of the apparatus increases. In order to suppress the increase in total height of the apparatus, the spacing distances between the respective trays must be arranged to be shorter.

However, with the spacing distances between the respective trays shortened, it becomes difficult for the user to discern the original loading tray 4, the original discharge tray 5 and the sheet discharge tray 6. Such an arrangement, therefore, tends to cause erroneous operations on the trays.

In particular, in recent years, in a composite apparatus having the copying function and the printer function in addition to the facsimile function, there has been such a proposal that, in providing the above-mentioned sorting function, in order to prevent sheets discharged in different modes, such as the copying mode, the facsimile mode and the printer mode, from mixing together, a sheet discharge tray onto which a sheet is discharged in a respective one of the different modes can be set beforehand selectable.

However, even in the case of this proposal, if the trays are spaced closer for suppressing the total height of the apparatus, it is still difficult to discriminate a tray onto which the sheet of an applicable mode is discharged from the other trays, so that an erroneous operation tends to take place.

Further, in the case of the facsimile apparatus shown in FIG. 5, the fore end parts of the respective trays are located approximately on one and the same plane. Therefore, when the user views the trays from the position of the visual line J, the trays are hidden by the uppermost tray, necessitating the user to grope for the applicable tray. Such groping tends to cause a mistake of the operation. To avoid such mistaking, when inserting or taking out a sheet into or from the applicable tray, the user has to view the position of each tray while stooping down to change the visual line J to the direction of the arrow H (hereinafter referred to as the visual line H). The operability of the apparatus, therefore, has been inadequate.

Further, when taking out a sheet or sheets from each of the trays, the user grasps the fore end of the sheet. However, if the fore end part of another tray located just above the applicable tray is located just above the fore end of the sheet to be taken out, the sheet cannot be easily taken out because the upper tray becomes an obstruction.

Further, in the case of a facsimile or a printer, a sheet taken out once from a tray is sometimes put back to the tray. In such a case, if the tray is hidden by another tray located just above the tray, the operation of putting the sheet back to the applicable tray is not easy, thereby degrading the operability of the apparatus.

The problem described above may be solved by increasing the vertical spacing distance between the trays to make the user's hand readily insertable. However, such a solution not only causes an increase in the height of an operation plane of each tray part but also causes the increase in size of the apparatus, resulting in an increase in cost.

BRIEF SUMMARY OF THE INVENTION

It is an object of the invention to provide an image forming apparatus arranged to have excellent operability in respect of observability of trays, taking and inserting sheets out of and onto the trays, etc., without increasing the height of the apparatus.

It is another object of the invention to provide an image forming apparatus arranged such that an operation means thereof has excellent observability and operability when the user of the apparatus performs a setting operation on the operation means while standing at the position in front of a frame body part of the apparatus, i.e., at the position on the front side of the apparatus.

To attain the above objects, in accordance with an aspect of the invention, there is provided a sheet stacking device, comprising a plurality of sheet trays for stacking sheets thereon, the plurality of sheet trays being disposed to be piled substantially in a vertical direction, wherein an end part in a width direction of at least one sheet tray of the plurality of sheet trays is shifted, in the width direction of the at least one sheet tray, from an end part in a width direction of another sheet tray of the plurality of sheet trays.

Further, in accordance with another aspect of the invention, there is provided an image forming apparatus, comprising image forming means for forming an image on a sheet, a frame body having the image forming means, original reading means disposed above the frame body for reading image information from an original, an original loading tray arranged to load thereon the original from which the image information is to be read by the original reading means, an original discharge tray piled with the original loading tray and arranged to discharge thereonto the original from which the image information has been read by the original reading means, and a sheet discharge tray disposed above the frame body and below the original discharge tray to be piled with the original discharge tray, and arranged to discharge thereonto the sheet on which the image has been formed by the image forming means, wherein end parts in a width direction of the original loading tray and the original discharge tray are located substantially at the same positions on both sides in the width direction, and an end part in a width direction of the sheet discharge tray is shifted, in the width direction of the sheet discharge tray, from the end parts in the width direction of the original loading tray and the original discharge tray.

These and other objects and features of the invention will become apparent from the following detailed description of a preferred embodiment thereof taken in connection with the accompanying drawings.

DETAILED DESCRIPTION OF THE INVENTION

Hereinafter, a preferred embodiment of the invention will be described in detail with reference to the drawings.

Figure 1:
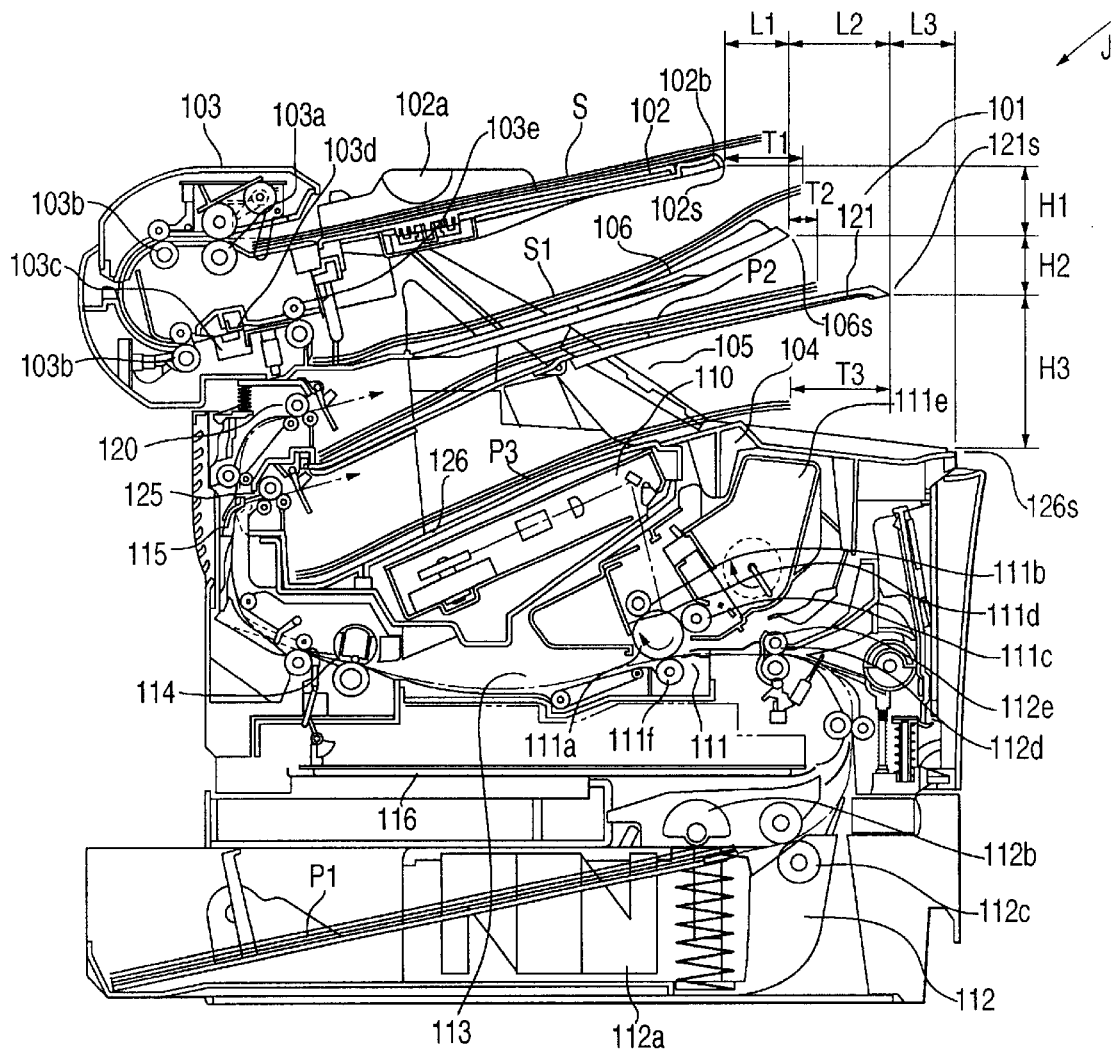
FIG. 1 is a sectional view showing the construction of a facsimile apparatus according to an embodiment of the invention.
Figure 2:
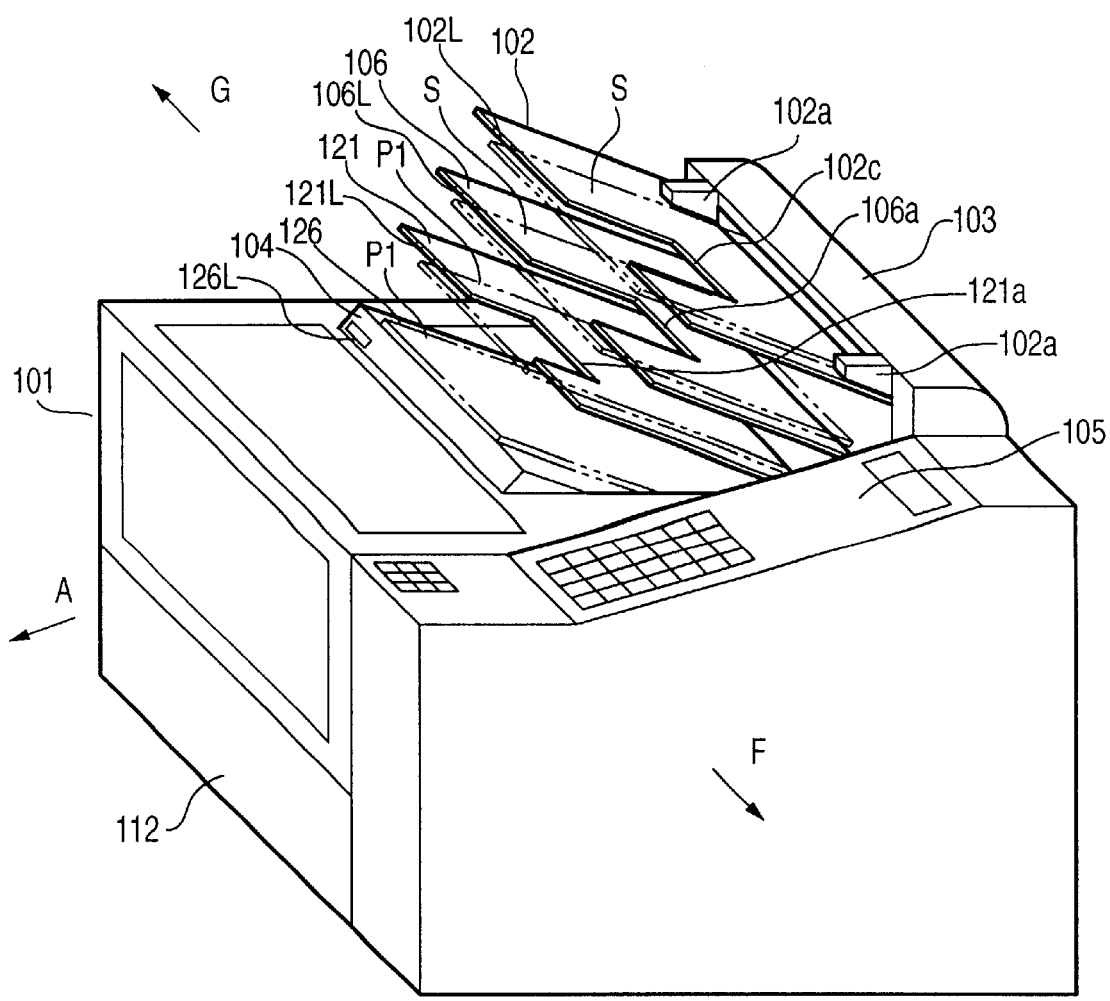
FIG. 2 is a perspective view showing the appearance of the facsimile apparatus.
Figure 3:
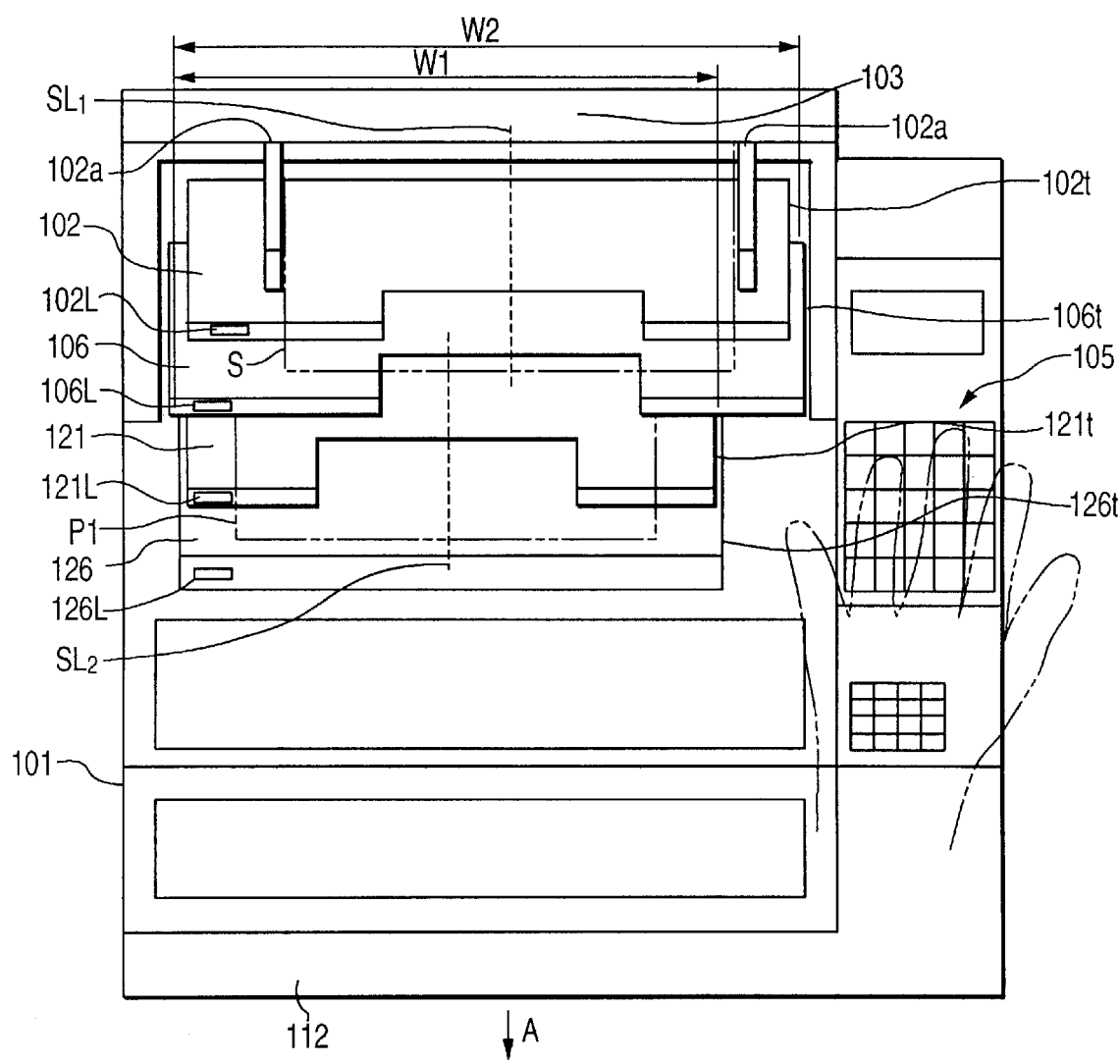
FIG. 3 is a view showing the appearance of the facsimile apparatus as viewed from the front side thereof.

FIG. 1 is a sectional view showing the construction of a facsimile apparatus serving as an image forming apparatus according to an embodiment of the invention. FIG. 2 is a perspective view showing the appearance of the facsimile apparatus. FIG. 3 is a view showing the appearance of the facsimile apparatus as viewed from the front side thereof (from the side on which an operation is performed by the user).

Referring to FIGS. 1 to 3, the facsimile apparatus has a frame body part 101. In FIGS. 2 and 3, an arrow A indicates the frontward direction of the apparatus.

As shown in FIG. 1, inside the frame body part 101, there are housed a cassette paper feed part 112 disposed on a bottom part of the frame body part 101 and having a sheet cassette 112a, a pickup roller 112b for sending out a sheet P1, a pair of separation rollers 112c for separating one sheet from other sheets, etc., an image forming part 111 disposed above the cassette paper feed part 112, two, upper and lower, sheet discharge parts 120 and 125 disposed above the image forming part 111 and at an inner part of the frame body part 101, and an original reading part 103 disposed above the sheet discharge parts 120 and 125 and at an inner part of the frame body part 101.

In the facsimile apparatus, there is adopted, as an image forming means for forming an image on a sheet, an electrophotographic recording system having a laser scanner 110 for emitting image light, the image forming part 111 for forming a toner image on a sheet on the basis of the image light coming from the laser scanner 110, and a thermal fixing device 114 for fixing the toner image to the sheet having the toner image formed thereon by the image forming part 111.

Thus, an image forming apparatus body 104 is formed jointly by the image forming means, the cassette paper feed part 112 for feeding a sheet to the image forming means, and the sheet discharge parts 120 and 125 arranged to discharge thereonto a sheet on which an image has been formed by the image forming means.

Further, a discharge flapper 115 is arranged above the thermal fixing device 114 inside the frame body part 101 to change a sheet conveying path between the upper sheet discharge part 120 and the lower sheet discharge part 125.

Further, in the facsimile apparatus, as shown in FIGS. 2 and 3, an operation part 105 composed of a display part, input keys, etc., is disposed at an upper surface part on the right side of the apparatus as viewed from the front side of the frame body part 101.

Further, a control part 116 for controlling the whole apparatus is disposed inside the frame body part 101 and above the cassette paper feed part 112.

In addition, in the facsimile apparatus, four trays 102, 106, 121 and 126 which are provided for loading a sheet or an original thereon are arranged to extend from the rear side to the front side of the frame body part 101 approximately in parallel with each other.

The rear ends of the respective trays 102, 106, 121 and 126 in the sheet-discharge direction are connected to the frame body part 101, while their fore ends extend toward the front side of the frame body part in an upward slanting state.

The tray 102 is an original loading tray arranged to be capable of loading thereon a plurality of sheets of original (hereinafter referred to as the original S) to be supplied to an original inserting port of the original reading part 103.

The tray 106 is an original discharge tray arranged to stack thereon the original S discharged from the original discharge port of the original reading part 103.

The tray 121 is an upper sheet discharge tray arranged to stack thereon a sheet discharged from the sheet discharge port of the upper sheet discharge part 120 to be placed thereon.

The tray 126 is a lower sheet discharge tray arranged to stack thereon a sheet discharged from the sheet discharge port of the lower sheet discharge part 125.

The construction and the operation of the respective parts of the facsimile apparatus are next described. The original reading part 103 is disposed above the image forming apparatus body 104 and is arranged to read image information from the original S during the facsimile transmission or copying of the original S.

As shown in FIG. 1, the original reading part 103 has an original conveying path of an approximately U shape formed inside the frame body part 101. The original conveying path is composed of parts including, in order from the upstream side of the sheet conveying direction, a pair of separation rollers 103a which are in pressed contact with each other, two pairs of conveying rollers 103b which are in pressed contact with each other, a tight-contact-type image sensor 103c serving as an image reading means, an original pressing part 103d which is arranged to push the original S against the tight-contact-type image sensor 103c, and a pair of original discharge rollers 103e which are in pressed contact with each other.

The original loading tray 102 is disposed at the original inserting port located at the most upstream part of the original conveying path. The original discharge tray 106 is disposed at the original discharge port which is located at the most downstream part of the original conveying path.

The original loading tray 102 is provided with sliders 102a which are arranged to be slidable in the direction perpendicular to the direction of conveying the original S, i.e., in the width direction of the original S. The sliders 102a are usable to true up the two sides of the original S loaded on the original loading tray 102.

The original loading tray 102 is provided further with an extension original tray 102b which extends in a direction reverse to the conveying direction of the original S. In a case where the original S is a long-sized original, the extension original tray 102b is opened to prevent the rear end part of the original S from drooping outside the original loading tray 102.

The tight-contact-type image sensor 103c is arranged to read image information from the original S by illuminating the image information surface of the original S with light of an LED array employed as a light source and causing the light reflected from the image information surface to be imaged on an image pickup element through a lens.

With the original reading part 103 arranged in the above manner, each of the sheets of the original S stacked on the original loading tray 102 is separated one by one from others with the separation roller pair 103a to be conveyed to the tight-contact-type image sensor 103c through the conveying roller pairs 103b.

Upon arrival at the tight-contact-type image sensor 103c, the original S is pushed against the tight-contact-type image sensor 103c by the original pressing part 103d to have the image information read by the tight-contact-type image sensor 103c in this state. After the reading of the image information, the original S is discharged onto the original discharge tray 106 through the above-stated original discharge roller pair 103e.

Thus, at the original reading part 103, the original S stacked on the original loading tray 102 begins to be conveyed from the front side toward the rear side of the frame body part 101 in the longitudinal direction thereof. The original S is then folded by the original conveying path of an approximately U shape to be discharged onto the original discharge tray 106 from the rear side toward the front side in the longitudinal direction of the frame body part 101. The sheets of the original S are thus stacked on the original discharge tray 106.

The cassette paper feed part 112, which is disposed at a bottom part of the frame body part 101, includes the paper feed cassette 112a arranged to stack and stow sheets of paper, the pickup roller 112b disposed above the paper feed cassette 112a, the pair of separation rollers 112c arranged to separate and convey the sheet picked up by the pickup roller 112b, a pair of registration rollers 112d arranged to correct the oblique travel of the sheet, and a TOP sensor 112e arranged to detect the position of the fore end of the sheet.

At the cassette paper feed part 112, the sheets P1 stacked on the paper feed cassette 112a are separated and conveyed one by one jointly by the pickup roller 112b and the separation roller pair 112c.

The oblique travel of the separated sheet P1 is corrected by the registration roller pair 112d. After that, the fore end position of the sheet P1 is detected by the TOP sensor 112e, and then the sheet P1 is conveyed to the image forming part 111.

The image forming part 111 includes a photosensitive member drum 111a, an electric charging means 111b, a developing means 111c, a cleaning means 111d for cleaning the photosensitive member drum 111a, and a transfer charger 111f disposed below the photosensitive member drum 111a. With the exception of the transfer charger 111f, all of these parts are integrally assembled inside a process cartridge 111e, which is detachably mounted on the frame body part 101.

Then, at the image forming apparatus body 104, image light is emitted from the laser scanner 110 on the basis of an image signal outputted from the control part 116. The photosensitive member drum 111a of the image forming part 111 is illuminated with the image light to form an electrostatic latent image on the surface of the photosensitive member drum 111a. The electrostatic latent image is converted into a toner image by the developing means 111c. The toner image is transferred to the sheet P1 conveyed from the cassette paper feed part 112 to the image forming part 111.

At the image forming part 111, the timing of paper feeding and the timing of image output are adjusted in such a way as to cause the fore end of the toner image formed on the photosensitive member drum 111a to coincide with the fore end of the sheet P1 conveyed from the cassette paper feed part 112. After the timing adjustment, the sheet P1 is conveyed to a nip part between the transfer charger 111f and the photosensitive member drum 111a.

After the toner image formed on the surface of the photosensitive member drum 111a is transferred to the sheet P1 by the transfer charger 111f, the sheet P1 is conveyed along a recording sheet conveying part 113 to have the toner image fixed to the sheet P1 by the thermal fixing device 114.

Further, the conveying path of the sheet P1 is then selectively changed by a change-over action of the discharge flapper 115 disposed on the downstream side of the thermal fixing device 114 either to a sheet conveying path leading to the upper sheet discharge part 120 or to another sheet conveying path leading to the lower sheet discharge part 125.

The sheet P1 thus caused by the change-over action of the discharge flapper 115 to take either a path to be discharged onto the upper sheet discharge tray 121 through the upper sheet discharge part 120 or a path to be discharged through the lower sheet discharge part 125 onto the lower sheet discharge tray 126 which is disposed below the upper sheet discharge tray 121. The change-over action of the discharge flapper 115 is performed under the control of a signal from the control part 116.

The facsimile apparatus is arranged to be settable into any of different operation modes, such as a copy mode in which an image read by the original reading part 103 is formed on a sheet by the image forming apparatus body 104, a facsimile receiving mode in which an image received by facsimile is formed on a sheet by the image forming apparatus body 104, a printer mode in which image data is inputted through an external interface (not shown) and the image of the inputted image data is formed on a sheet by the image forming apparatus body 104, and a report output mode in which information of varied kinds, such as information on the current setting values, etc., of the apparatus is outputted.

In selecting one of these modes, selection of the lower sheet discharge tray 126 or the upper sheet discharge tray 121 for discharging the sheet having an image formed thereon can be made beforehand by the user by operating the operation part 105.

With the change-over action of the discharge flapper 115 controlled as mentioned above by the control part 116 according to a setting operation performed on the operation part 105, a sheet on which an image has been formed in the applicable mode can be discharged and stacked on the applicable discharge tray.

Thus, in the facsimile apparatus, a sheet having an image formed thereon is discharged from the rear side toward the front side of the frame body part 101 in the longitudinal direction thereof. The sheets thus discharged are stacked either on the upper sheet discharge tray 121 or the lower sheet discharge tray 126.

Next, the structural arrangement of the respective trays of the facsimile apparatus is described in detail. In the facsimile apparatus, as shown in FIG. 3, the trays are arranged such that the center position SL1 in a width direction of each of the original loading tray 102 and the original discharge tray 106 differs from the center position SL2 in a width direction of each of the upper sheet discharge tray 121 and the lower sheet discharge tray 126.

In a case where a number of trays are disposed to be piled in the vertical direction, as in the case of the facsimile apparatus, it is not easy for the user to accurately discriminate, from other trays, a tray on which a desired original or sheet is discharged.

To solve this problem, therefore, according to the embodiment of the invention, the position of one tray is differentiated from that of another tray by shifting the center position of the tray arranged to load thereon or discharge thereonto an original and the center position of the tray arranged to discharge thereonto a sheet having an image formed thereon from each other in the transverse direction (in the width direction of the tray).

More specifically, in the facsimile apparatus, as shown in FIG. 3, when the upper sheet discharge tray 121 and the lower sheet discharge tray 126 are assumed to have about the same width which is represented W1, and the original loading tray 102 and the original discharge tray 106 are assumed to have about the same width which is represented by W2, the size of the width W1 and that of the width W2 are arranged to differ from each other.

In other words, the trays on which originals are to be placed are arranged to have about the same width W1 and the trays on which sheets are to be placed are arranged to have about the same width W2. The originals and the sheets having images formed thereon thus can be separated into the respective groups. This arrangement enables the user to instantly make a discrimination between a tray on which an original is to be placed and a tray on which an image-formed sheet is to be placed. The visibility or observability and operability (for taking out) of the sheets placed on the trays are enhanced. Therefore, the user can visually discern between the original S and the sheet P without difficulty.

In addition, the facsimile apparatus is arranged to convey sheets by the so-called center reference method, whereby the center of width of the sheet is kept constant in the sheet conveying direction irrespective of the size of the sheet. The sheet of any size, therefore, can be conveyed with its center of width in the sheet conveying direction located always on a fixed line of the conveying path. However, the position where the edge of the sheet passes varies with the size of the sheet. Further, the center line of each tray is thus generally made to coincide with the center of width of the sheet in the sheet conveying direction.

Therefore, also in the facsimile apparatus according to the embodiment, the center position in the sheet width direction of the original S placed on each of the original loading tray 102 and the original discharge tray 106 is arranged to be always on the center line SL1 of the trays, as shown in FIG. 3, irrespective of the size of the sheet.

Further, the sheet P1, which is conveyed from the cassette paper feed part 112 to be placed on the upper sheet discharge tray 121 or the lower sheet discharge tray 126, is also arranged to have its center always on the center line SL2 of the trays, as shown in FIG. 3, irrespective of the size of the sheet.

This arrangement makes sheets more visually discernible as the center of the original S and that of the sheet P1 are shifted from each other, in addition to a difference in position between the trays.

Further, with the center line of the trays for the original and the center line of the trays for the discharge of sheets arranged to be shifted from each other, i.e., by differentiating the length in the width direction of the trays for the original from that of the trays for the discharge of sheets, a large space can be taken at the side portion of the sheet discharge trays above the upper surface of the facsimile apparatus, as shown in FIG. 3.

In the facsimile apparatus according to the embodiment, the operation part 105 arranged to permit various operations and to display the status of the apparatus is disposed at the upper surface part of the apparatus on the side of the above space.

More specifically, as shown in FIG. 3, comparing with each other the positions of the end parts 102$t$, 106$t$, 121$t$ and 126$t$ of the trays on their right sides as viewed from the front of the apparatus (on the side at which the operation part 105 is located), the right end parts 121$t$ and 126$t$ of the upper sheet discharge tray 121 and the lower sheet discharge tray 126 are located further away from the operation part 105 than the right end parts 102$t$ and 106$t$ of the original loading tray 102 and the original discharge tray 106.

With the facsimile apparatus arranged according to the embodiment in the manner described above, the visibility and operability of the operation part 105 are enhanced for the user in operating the operation part 105. Then, the user is enabled to operate the operation part 105 without having his or her hand coming into contact or interfering with the upper sheet discharge tray 121 and the lower sheet discharge tray 126 and sheets placed on these trays.

Incidentally, in the facsimile apparatus according to the embodiment, the operation part 105 is disposed on the right side of the apparatus. This is because the number of right-handed persons is generally greater than left-handed persons, and, therefore, the facsimile apparatus is designed to facilitate operations by right-handed persons. However, the same advantageous effects of the invention are of course attainable by arranging the operation part 105 on the left side of the apparatus and shifting the upper sheet discharge tray 121 and the lower sheet discharge tray 126 rightward with respect to the center of the trays for the original.

In the facsimile apparatus according to the embodiment, the end parts of the trays on the side opposite to the side on which the operation part 105 is disposed are aligned to be at about the same position. However, the invention is not limited to this arrangement, and the end parts on this side do not have to be aligned. In other words, the width of the sheet discharge trays does not have to be shorter than the width of the trays for the original, and their end parts also do not have to be aligned.

However, in an apparatus in which the end parts of the sheet discharge trays and the end parts of the trays for the original on the side opposite to the side on which the operation part 105 is disposed are not aligned, the sheet discharge trays come to protrude further to cause an increase in width of the apparatus than in the apparatus in which these end parts are not aligned. Therefore, it is preferable that the end parts of the trays on the above-stated side are aligned.

The facsimile apparatus according to the embodiment is arranged to convey sheets by the center reference method, as mentioned above. However, the invention is not limited to this method. The sheet conveying method may be changed to a one-side reference method whereby the sheets may be conveyed with any one of sides of sheets always used as a reference irrespectively of the size of the sheet. In the one-side reference method, in a case where the length in the width direction of the trays for the original and that of the sheet discharge trays are about the same and the positions of their end parts are not shifted from each other, if the maximum size of an original to be read is the same as the maximum size of a sheet to be image-formed, the position of the center of the original becomes the same as that of the center of the sheet, thereby making the original and the sheet hardly distinguishable from each other.

However, according to the embodiment, since the position of the end parts of the trays for the original differs from that of the sheet discharge trays, the trays for the original are visually distinguishable from the sheet discharge trays irrespective of the sheet conveying method.

Next, the positions of the fore end parts of the trays in the longitudinal direction of the sheet are described.

As shown in FIG. 1, the original loading tray 102 has a fore end part 102$s$ (hereinafter referred to as the original-loading-tray fore end part). The original discharge tray 106 has a fore end part 106$s$ (hereinafter referred to as the original-discharge-tray fore end part). The upper sheet discharge tray 121 has a fore end part 121$s$ (hereinafter referred to as the upper-sheet-discharge-tray fore end part). The lower sheet discharge tray 126 has a fore end part 126$s$ (hereinafter referred to as the lower-sheet-discharge-tray fore end part).

The configuration of these trays is arranged such that the fore end parts of the trays are closer to the front side of the frame body part 101, i.e., the front of the apparatus, accordingly as the positions of the trays are lower. In other words, the fore end parts of the trays are located more inward within the frame body part 101 accordingly as the positions of the trays are higher.

More specifically, with the original loading tray 102 disposed uppermost, the original-discharge-tray fore end part 106$s$ of the original discharge tray 106, which is disposed below the original loading tray 102, is shifted toward the front of the apparatus as much as a distance L1 from the original-loading-tray fore end part 102$s$ of the original loading tray 102.

Further, the upper-sheet-discharge-tray fore end part 121$s$ of the upper sheet discharge tray 121, which is disposed below the original discharge tray 106, is shifted toward the front of the apparatus as much as a distance L2 from the original-discharge-tray fore end part 106$s$ of the original discharge tray 106.

Furthermore, the lower-sheet-discharge-tray fore end part 126$s$ of the lower sheet discharge tray 126, which is disposed below the upper sheet discharge tray 121, is shifted toward the front of the apparatus as much as a distance L3 from the upper-sheet-discharge-tray fore end part 121$s$ of the upper sheet discharge tray 121.

Figure 4:
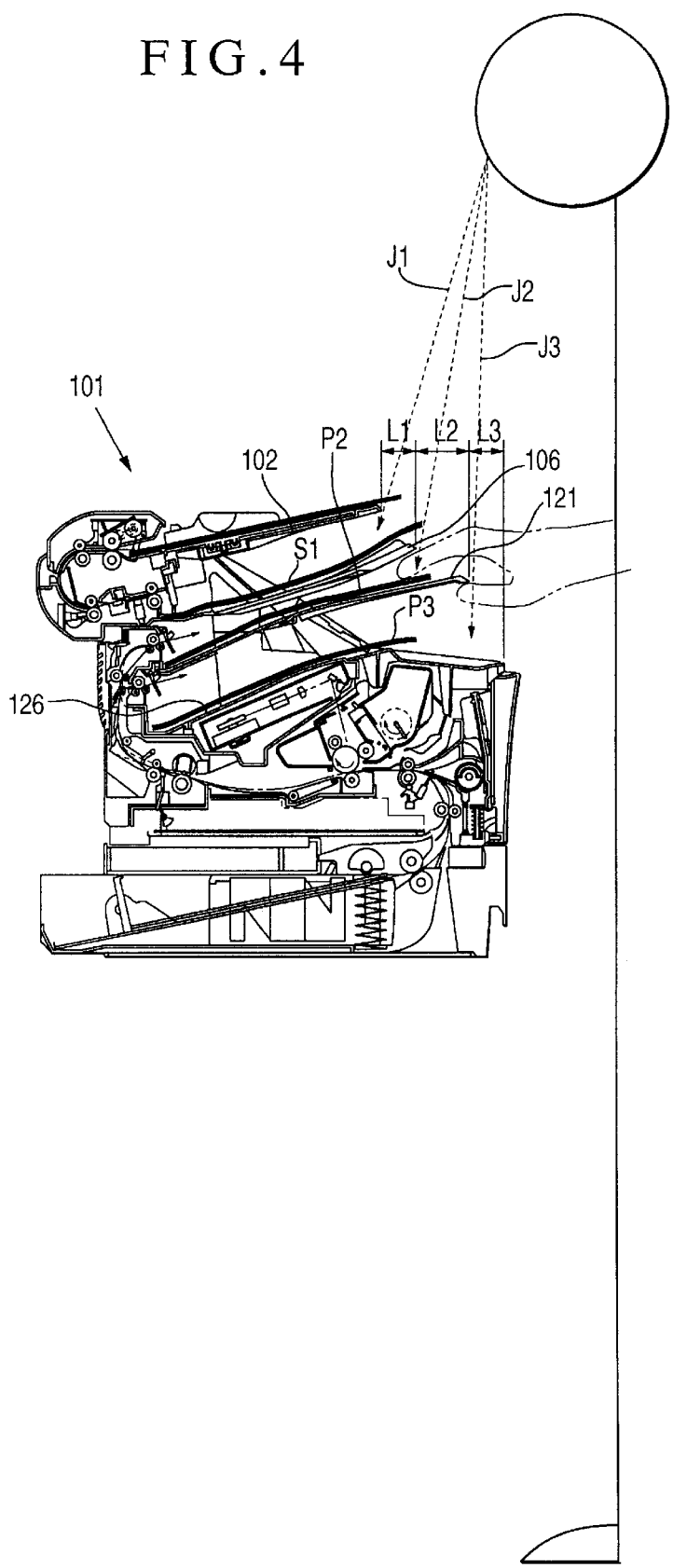
FIG. 4 is a diagram for explaining a case where the facsimile apparatus is operated by the user thereof.
Figure 5:
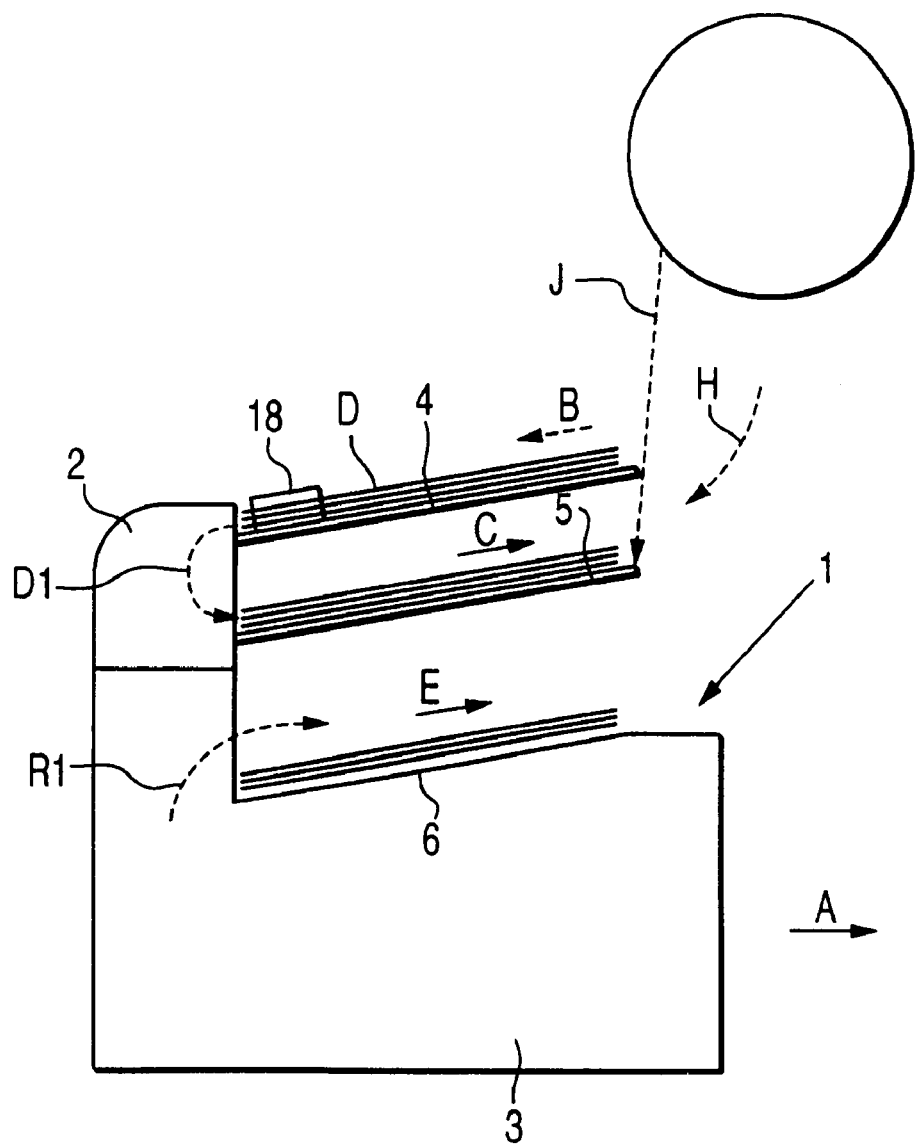
FIG. 5 is a schematic sectional view showing the construction of a conventional image forming apparatus.

FIG. 4 shows such a state that the user is operating the facsimile apparatus placed on a desk (not shown) while standing on the front side of the frame body part 101. As shown in FIG. 4, when the visual lines of the user applied to the respective trays in this state are assumed to be represented by arrows J1, J2 and J3, each of the fore end parts of these trays is never hidden by another fore end part as viewed along the visual lines J1, J2 and J3, because they are shifted from each other as much as the distances L1, L2 and L3.

In other words, the facsimile apparatus is arranged to have all the trays visible by the user when the facsimile apparatus is being operated by the user. In the embodiment, each of the amounts of shifting L1, L2 and L3 arranged to enable the user to view the trays are set to a value within a range from 10 to 60 mm, which does not cause any excessive increase in size of the apparatus.

Further, as mentioned in the foregoing, the end parts 121t and 126t of the sheet discharge trays 121 and 126 on the side of the operation part 105 in the width direction perpendicular to the sheet conveying direction are located further away from the operation part 105 than the ends parts 102t and 106t of the trays 102 and 106 for the original on the side of the operation part 105.

As apparent from FIGS. 2 and 3, the fore end parts of the original loading tray 102 and the original discharge tray 106 are located more inward than the fore end parts of the sheet discharge trays 121 and 126. Although the fore end parts of the upper sheet discharge tray 121 and the lower sheet discharge tray 126 are thus located closer to the front side of the apparatus, the sheet discharge trays 121 and 126 are located away from the operation part 105 in the width direction, so that a very large space can be obtained above the operation part 105. Then, the large space enhances the observability and operability of the operation part 105.

Now, assuming that the amount of shifting of the fore end of the original S1 discharged and stacked on the original discharge tray 106 from the original-loading-tray fore end part 102s of the original loading tray 102 is T1, as shown in FIG. 1, the original-loading-tray fore end part 102s of the original loading tray 102 is shifted inward within the frame body part 101, i.e., closer to the original reading part 103, as much as the amount of shifting T1 from the fore end of the original S1 discharged and stacked on the original discharge tray 106.

With the facsimile apparatus arranged in this manner, the fore end of the original S1 discharged and stacked on the original discharge tray 106 is visible, as shown in FIG. 4, from the direction of the arrow J (along the visual line J2). Besides, since the original loading tray 102 is located out of the way in taking out the original S, the original S1 can be smoothly taken out.

Further, assuming that the amount of shifting of the fore end of a sheet P2 discharged and stacked on the upper sheet discharge tray 121 from the original-discharge-tray fore end part 106s of the original discharge tray 106 is T2, as shown in FIG. 1, the original-discharge-tray fore end part 106s of the original discharge tray 106 is shifted inward within the frame body part 101, i.e., closer to the original reading part 103, as much as the amount of shifting T2 from the fore end of the sheet P2 discharged and stacked on the upper sheet discharge tray 121.

With the facsimile apparatus arranged in this manner, the fore end of the sheet P2 discharged and stacked on the upper sheet discharge tray 121 is visible, as shown in FIG. 4, in the direction of the arrow J2. Besides, since the original discharge tray 106 is located out of the way in taking out the sheet P2, the sheet P2 can be smoothly taken out.

The positional relation of each sheet to the tray varies with the size of the sheet used. In the case of the embodiment, the size of sheets normally used (hereinafter referred to as a normal-use size) is assumed to be either the size A4 or the so-called letter size. FIGS. 1 and 4 show in sectional views the original S1 and the sheets P1 and P2 which are in the normal-use size.

Further, in a case where the length of an original or a sheet is shorter than the normal-use size (hereinafter referred to as a small-size paper sheet), the small-size paper sheet which is discharged onto a given one of the trays might happen to be hidden by a tray disposed above the given tray. To cope with this problem, in the facsimile apparatus according to the embodiment, as shown in FIG. 2, a U-shaped cutout part 102c is formed in the middle of the original loading tray 102, a U-shaped cutout part 106a is formed in the middle of the original discharge tray 106, and a U-shaped cutout part 121a is formed in the middle of the upper sheet discharge tray 121. By virtue of these cutout parts, the small-size paper sheet discharged onto a tray located below each tray can be easily taken out.

Further, in the embodiment, as shown in FIG. 1, the fore end of a sheet P3 discharged onto the lower sheet discharge tray 126 is shifted inward within the frame body part 101, i.e., closer to the original reading part 103, from the upper-sheet-discharge-tray fore end part 121s of the upper sheet discharge tray 121. The fore end of the sheet P3 thus comes to be located below the upper sheet discharge tray 121. However, there is a large vertical spacing distance between the upper sheet discharge tray 121 and the lower sheet discharge tray 126 to give the advantage mentioned in the foregoing.

More specifically, in the embodiment, the upper sheet discharge tray 121 is arranged to permit stacking up to 100 sheets, while the lower sheet discharge tray 126 is arranged to permit stacking up to 200 sheets. when a vertical spacing distance provided between the fore end part 102s of the original loading tray 102 and the fore end part 106s of the original discharge tray 106 is assumed to be H1, a vertical spacing distance between the fore end part 106s of the original discharge tray 106 and the fore end part 121s of the upper sheet discharge tray 121 is assumed to be H2, and a vertical spacing distance between the fore end part 121s of the upper sheet discharge tray 121 and the fore end part 126s of the lower sheet discharge tray 126 is assumed to be H3, the vertical spacing distance H3 is arranged to be greatly larger than each of the spacing distances H1 and H2. Therefore, even if the fore end of the sheet P3 discharged onto the lower sheet discharge tray 126 is shifted inward within the frame body part 101 from the fore end part 121s of the upper sheet discharge tray 121, the sheet P3 can be easily taken out from the facsimile apparatus.

The above-stated arrangement of the facsimile apparatus according to the embodiment enhances the observability of the trays in taking out the original or the sheet from the front side of the frame body part 101, i.e., from the front side of the apparatus, even with the user observing the trays from the just front side or obliquely from the front side of the apparatus. The arrangement, therefore, not only enables the user to easily take out the original or the sheet without his or her hand interfering with the tray disposed above the applicable tray, but also enhances the operability of the apparatus as the original and the sheet are visible from above the apparatus.

In the facsimile apparatus according to the embodiment, the fore end parts of the trays are arranged, as mentioned above, to be shifted from each other in such a way as to permit the user to take out sheets without difficulty. Therefore, the vertical spacing distance H2 between the upper sheet discharge tray 121 and the original discharge tray 106 and the vertical spacing distance H1 between the original discharge tray 106 and the original loading tray 102 have nothing to do with the easiness or difficulty of taking out sheets. Accordingly, each of the distances H1 and H2 can be reduced to a minimum distance necessary for stacking originals or image-formed sheets up to a necessary height.

Further, if, in the facsimile apparatus, the function of facsimile or printer is used, an original or a sheet once taken out from a tray is sometimes brought back to the tray. In such a case, the original or the sheet can be easily reinserted along the upper face of the fore end part of the tray as there is no impediment member above the fore end part of the tray.

Further, in the facsimile apparatus according to the embodiment, as shown in FIGS. 2 and 3, labels 102L, 106L, 121L and 126L which indicate the functions of the trays are stuck respectively to the fore end parts of the trays 102, 106, 121 and 126.

The labels 102L, 106L, 121L and 126L are stuck to label-sticking recessed parts (not shown) which are located on the outer side of sheet placing positions set for sheets of the largest width placeable on the trays 102, 106, 121 and 126, as indicated by two-dot chain lines in FIG. 3.

Each of the labels 102L, 106L, 121L and 126L is a seal member having an adhesive applied to the back side thereof. The names of functions of the applicable trays are written on the surfaces of these labels. For example, words reading "ORIGINAL IN" are written on the surface of the label 102L attached to the original loading tray 102. Words reading "ORIGINAL OUT" are written on the label 106L attached to the original discharge tray 106.

As for the labels 121L and 126L which are on the side of the image forming apparatus body 104, the names of functions (modes) or tray numbers selected by the user by operating the operation part 105 beforehand are written on them. For example, words indicating a tray number "OUTPUT 2" are written on the label 121L attached to the upper sheet discharge tray 121, and words indicating another tray number "OUTPUT 1" are written on the label 126L of the lower sheet discharge tray 126. The user may select, for example, a label which indicates the function (or mode) reading "COPY", "PRINTER", "FACSIMILE" or the like and stick the label to the upper sheet discharge tray 121 or the lower sheet discharge tray 126.

While, in the embodiment, the labels 102L, 106L, 121L and 126L are arranged to be stuck respectively to the trays 102, 106, 121 and 126 at their left end parts, the arrangement may be changed to stick them to these trays either at their right end parts or both at their left and right end parts.

The above-stated tray labeling arrangement of the facsimile apparatus according to the embodiment enables the user to correctly recognize the functions of trays, so that the possibility of such an operation error that the user puts an original on a sheet discharge tray can be eliminated.

In the embodiment, as mentioned above, the fore end positions of the trays are shifted from each other to eliminate the possibility of having the fore end parts of a lower tray hidden by a higher tray. Therefore, each of the labels provided on the trays is never hidden by another tray to ensure good observability of the labels.

Further, in the embodiment, the labels 102L, 106L, 121L and 126L are stuck at positions which are on the outside of the range of maximum width of the original S and that of the sheet P1. These labels are, therefore, never hidden beneath the original and the sheet.

Further, in the embodiment, as mentioned above, the left-side ends of the trays are arranged to be at about the same position. With the labels 102L, 106L, 121L and 126L stuck on the left end side, therefore, they are easily visible.

In the case of the above-described embodiment, the sheet discharge trays on the side of the image forming apparatus body 104 are arranged in two steps. However, in accordance with the invention, the number of steps of the sheet discharge trays may be increased to three or more steps.

For example, the facsimile apparatus may be arranged to include an additional sheet discharge port for a sorter or the like and to have an additional sheet discharge tray inserted in between the upper sheet discharge tray 121 and the original discharge tray 106. In such a modification, the position of the fore end part of each of the trays is also arranged, as described above, to be shifted inward, i.e., toward the rear side of the apparatus, from the fore end part of a tray disposed below the applicable tray, and outward, i.e., toward the front side of the apparatus, from the fore end part of a tray disposed above the applicable tray.

The modification is also arranged to have the position of the fore end part of each of the trays shifted inward from the fore end of a sheet placed on a tray located below the applicable tray, and to have labels indicating the functions of the trays stuck at positions located outside the maximum allowable width of sheets. With the modification arranged in this manner, the same advantageous effects of the embodiment described above can be obtained by the modification.

According to the embodiment as described above in detail, in an image forming apparatus, such as a facsimile or a printer, in which a plurality of trays arranged to stack sheets thereon are disposed to be piled in the vertical direction, the positions and lengths of the trays in the width direction of sheets and in the direction of the fore ends of sheets are set, as described above, to enable the user to easily discern sheets and originals discharged onto the trays.

Further, as described above, the operation part 105 is disposed in a space obtained by arranging the centers of the trays for the original in the sheet-discharge direction to be shifted from the centers of the sheet discharge trays in the sheet-discharge direction. This arrangement increases spaces around the operation part 105 to enhance the observability of the operation part 105 for the user and also to effectively enhance the accessibility onto the operation part 105.

In the case of the embodiment described above, the direction of drawing out the cassette paper feed part 112 from the apparatus is the direction of an operation of the apparatus. In other words, the cassette (the cassette paper feed part 112) can be drawn out in the same direction as the direction in which the sheets are discharged onto the sheet discharge trays. All operations such as stacking the original, taking sheets out, taking the cassette out, etc., are thus arranged to be performed in one and the same direction. This arrangement permits substantial reduction in areas occupied by the apparatus and enhances the usability of the apparatus.

The direction in which the recording sheets contained in the cassette paper feed part 112 are conveyed is also arranged to be the same as the direction of drawing out the cassette. This is because the probability of occurrence of jamming is high around the pickup roller 112b and the separation roller pair 112c of the paper feed part 112 and these members require maintenance services more often than other parts. In view of this, these members are disposed on the operation side of the apparatus to enable the user or a serviceman to readily have access to them for correcting a jammed condition or for some maintenance work. This arrangement enhances the operability of the apparatus.

In the case of the embodiment described above, the invention is applied to a facsimile apparatus having a reading means disposed at an upper portion thereof. However, the invention is applicable also to a printer having no reading means. If the printer is of the type having a plurality of bin trays arranged for different users above the housing of the printer, for example, these trays can be visually differentiated by arranging their end parts to be shifted from each other in accordance with the invention.

What is claimed is:

1. A sheet stacking device, comprising:
   a plurality of sheet trays for stacking sheets thereon, said plurality of sheet trays being disposed to be piled substantially in a vertical direction, wherein an end part in a width direction of at least one sheet tray of said plurality of sheet trays is shifted, in the width direction of said at least one sheet tray, from an end part in a width direction of another sheet tray of said plurality of sheet trays,
   wherein the center in the width direction of said at least one sheet tray having the end part thereof shifted and the center in the width direction of said another sheet tray are shifted from each other in the width direction of said at least one sheet tray.

2. A sheet stacking device according to claim 1, wherein the center in the width direction of said at least one sheet tray having the end part thereof shifted and the center in the width direction of a third sheet tray are located at one and the same position in the width direction of said at least one sheet tray.

3. A sheet stacking device according to claim 1, wherein the length in the width direction of said at least one sheet tray having the end part thereof shifted is shorter than the length in the width direction of said another sheet tray, and an end part on one side of said at least one sheet tray having the shorter length is set in alignment with an end part on one side of said another sheet tray having the longer length in such a way as to have end parts on the other side of said at least one sheet tray and said another sheet tray shifted from each other.

4. A sheet stacking device according to claim 1, wherein the length in a direction of conveying sheets of each of said plurality of sheet trays becomes longer progressively from an upper sheet tray to a lower sheet tray among said plurality of sheet trays disposed to be piled.

5. An image forming apparatus, comprising:
   image forming means for forming an image on a sheet;
   a frame body having said image forming means;
   original reading means disposed above said frame body for reading image information from an original;
   an original loading tray arranged to load thereon the original from which the image information is to be read by said original reading means;
   an original discharge tray piled with said original loading tray and arranged to discharge thereonto the original from which the image information has been read by said original reading means; and
   a sheet discharge tray disposed above said frame body and below said original discharge tray to be piled with said original discharge tray, and arranged to discharge thereonto the sheet on which the image has been formed by said image forming means,
      wherein end parts in a width direction of said original loading tray and said original discharge tray are located substantially at the same positions on both sides in the width direction, and
      an end part in a width direction of said sheet discharge tray is shifted, in the width direction of said sheet discharge tray, from the end parts in the width direction of said original loading tray and said original discharge tray.

6. An image forming apparatus according to claim 5, wherein the center in the width direction of said sheet discharge tray and the center in the width direction of each of said original loading tray and said original discharge tray are shifted from each other in the width direction of said sheet discharge.

7. An image forming apparatus according to claim 5, wherein the center in the width direction of said sheet discharge tray and the center in the width direction of each of said original loading tray and said original discharge tray are located at one and the same position in the width direction of said sheet discharge tray.

8. An image forming apparatus according to claim 5, wherein the length in the width direction of said sheet discharge tray is shorter than the length in the width direction of each of said original loading tray and said original discharge tray, and an end part on one side of said sheet discharge tray is set in alignment with an end part on one side of each of said original loading tray and said original discharge tray in such a way as to have an end part on the other side of said sheet discharge tray shifted from an end part on the other side of each of said original loading tray and said original discharge tray.

9. An image forming apparatus according to claim 5, wherein a sheet cassette arranged to house therein sheets on which images are to be formed by said image forming means is detachably mounted on said frame body, and a direction of drawing out said sheet cassette is the same as a direction of discharging sheets to be stacked on each of said sheet discharge tray and said original discharge tray.

10. An image forming apparatus according to claim 9, further comprising an operation part arranged, on an upper surface of said frame body and on one side of positions where said original loading tray, said original discharge tray and said sheet discharge tray are disposed, to permit an operation on said image forming apparatus from the direction of drawing out said sheet cassette, and
    wherein said sheet discharge tray is disposed such that an end part of said sheet discharge tray on the side of said operation part is further away from said operation part than an end part of each of said original loading tray and said original discharge tray on the side of said operation part.

11. An image forming apparatus according to claim 9, wherein a direction of feeding sheets housed in said sheet cassette to said image forming means is the same as the direction of drawing out said sheet cassette.

12. An image forming apparatus according to claim 5, wherein end parts on one side in a sheet conveying direction of said sheet discharge tray, said original loading tray and said original discharge tray are held by said frame body, and end parts on the other side in the sheet conveying direction of said sheet discharge tray, said original loading tray and said original discharge tray, which are not held by said frame body, are arranged to have a longer distance from the end parts held by said frame body progressively from said original loading tray to said sheet discharge tray disposed lowermost.

13. An image forming apparatus comprising:
    image forming means for forming an image on a sheet;
    a frame body having said image forming means; and
    a plurality of sheet trays disposed to be piled above said frame body and arranged to stack thereon the sheet on which the image has been formed by said image forming means, and
    wherein an end part in a width direction of at least one sheet tray of said plurality of sheet trays is shifted, in the width direction of said at least one sheet tray, from an end part in a width direction of another sheet tray of said plurality of sheet trays, wherein the center in the width direction of said at least one sheet tray having the end part thereof shifted and the center in the width direction of said an other sheet tray are shifted from each other in the width direction of said at least one sheet tray.

14. An image forming apparatus according to claim 13, wherein the center in the width direction of said at least one sheet tray having the end part thereof shifted and the center in the width direction of a third sheet tray are located at one and the same position in the width direction of said at least one sheet tray.

15. An image forming apparatus according to claim 13, wherein the length in the width direction of said at least one sheet tray having the end part thereof shifted is shorter than the length in the width direction of said another sheet tray, and an end part on one side of said at least one sheet tray having the shorter length is set in alignment with an end part on one side of said another sheet tray having the longer length in such a way as to have end parts on the other side of said at least one sheet tray and said another sheet tray shifted from each other.

16. An image forming apparatus according to claim 13, wherein a sheet cassette arranged to house therein sheets on which images are to be formed by said image forming means is detachably mounted on said frame body, and a direction of drawing out said sheet cassette is the same as a direction of discharging sheets to be stacked on said plurality of sheet trays.

17. An image forming apparatus according to claim 16, further comprising an operation part arranged, on an upper surface of said frame body and on one side of positions where said plurality of sheet trays are disposed, to permit an operation on said image forming apparatus, a direction from which to operate said operation part being the direction of drawing out said sheet cassette, and wherein said at least one sheet tray having the end part thereof shifted among said plurality of sheet trays is at least a sheet tray disposed lowermost, and an end part, on the side of said operation part, of said at least one sheet tray having the end part thereof shifted is further away from said operation part than an end part, on the side of said operation part, of said another sheet tray.

18. An image forming apparatus according to claim 16, wherein a direction of feeding sheets housed in said sheet cassette to said image forming means is the same as the direction of drawing out said sheet cassette.

19. An image forming apparatus according to claim 17, wherein said operation part is disposed on a right side of an upper surface of said body with said frame body viewed from the direction of drawing out said sheet cassette.

20. An image forming apparatus according to claim 13, wherein end parts on one side of said plurality of sheet trays are held by said frame body, and end parts on the other side of said plurality of sheet trays are arranged to have a longer distance from the end parts held by said frame body progressively from an upper sheet tray to a lower sheet tray among said plurality of sheet trays disposed to be piled.

21. A sheet stacking device, comprising:

a first tray for stacking sheets thereon, said first tray has a first end part in a width direction of said first tray;

a second tray for stacking sheets thereon, said second tray has a second end part in a width direction of said second tray, wherein said first end part and said second end part are disposed at a same side of the sheet stacking device;

wherein said first end part is shifted from said second end part in the width direction of said first tray, and the center in the width direction of said first tray is shifted in the width direction of said first tray from the center in the width direction of said second tray.

22. An image forming apparatus, comprising:

image forming means for forming an image on a sheet;

reading means disposed above said image forming means for reading image information from an original;

a first tray for stacking sheets discharged from said image forming means thereon, said first tray has a first end part in a width direction of said first tray;

a second tray for stacking documents related to said reading means thereon, said second tray has a second end part in a width direction of said second tray, wherein said first end part and said second end part are disposed at a same side of the sheet stacking device;

wherein said first end part is shifted from said second end part in the width direction of said first tray.

23. An image forming apparatus according to claim 22, wherein the center in the width direction of said first tray is shifted in the width direction of said first tray from the center in the width direction of said second tray.

24. An image forming apparatus according to claim 22, wherein said second tray is arranged to load thereon the original from which the image information is to be read by said reading means.

25. An image forming apparatus according to claim 22, wherein said second tray is arranged to discharge thereonto the original from which the image information has been read by said reading means.

* * * * *

UNITED STATES PATENT AND TRADEMARK OFFICE
CERTIFICATE OF CORRECTION

PATENT NO.    : 6,385,433 B1
DATED         : May 7, 2002
INVENTOR(S)   : Hirohisa Sawada It is certified that error appears in the above-identified patent and that said Letters Patent is hereby corrected as shown below:

<u>Title page,</u>
Item [56], References Cited, FOREIGN PATENT DOCUMENTS, "358036840" should read -- 58-36840 --; "361287656" should read -- 61-287656 --; and "2500238952" should read -- 2000-238952 --.

<u>Column 1,</u>
Line 23, "recednt" should read -- recent --.

<u>Column 11,</u>
Line 3, "are" should read -- is --.

<u>Column 17,</u>
Line 5, "an other" should read -- another --.

Signed and Sealed this

Eighth Day of October, 2002

*Attest:*

*Attesting Officer*

JAMES E. ROGAN
*Director of the United States Patent and Trademark Office*